United States Patent
Bertelo et al.

(10) Patent No.: US 12,180,360 B2
(45) Date of Patent: Dec. 31, 2024

(54) HEAT TREATED POLYMER POWDERS

(71) Applicant: Arkema Inc., King of Prussia, PA (US)

(72) Inventors: Christopher A. Bertelo, Doylestown, PA (US); Manuel A. Garcia-Leiner, Baltimore, MD (US); Anthony Decarmine, Lebanon, CT (US); Scott F. Defelice, Holyoke, MA (US)

(73) Assignee: Arkema Inc., King of Prussia, PA (US)

( * ) Notice: Subject to any disclaimer, the term of this patent is extended or adjusted under 35 U.S.C. 154(b) by 0 days.

(21) Appl. No.: 17/340,420

(22) Filed: Jun. 7, 2021

(65) Prior Publication Data

US 2021/0292544 A1 Sep. 23, 2021

Related U.S. Application Data

(63) Continuation of application No. 16/704,134, filed on Dec. 5, 2019, now Pat. No. 11,046,847, which is a
(Continued)

(51) Int. Cl.
*C08L 61/16* (2006.01)
*B29B 15/00* (2006.01)
(Continued)

(52) U.S. Cl.
CPC ............. *C08L 61/16* (2013.01); *B29B 15/00* (2013.01); *B29C 39/08* (2013.01); *B29C 64/153* (2017.08);
(Continued)

(58) Field of Classification Search
CPC ....... C08L 61/16; C08G 2650/40; C08G 8/02; B33Y 70/00; B29K 2071/00; B29K 2995/004; B29B 13/021; B29B 15/00
See application file for complete search history.

(56) References Cited

U.S. PATENT DOCUMENTS 4,816,556 A 3/1989 Gay et al.
5,110,880 A 5/1992 Harris et al.
(Continued)

FOREIGN PATENT DOCUMENTS

EP 0 138 129 B1 4/1990

OTHER PUBLICATIONS

Gardner, KennCorwin et al. "Structure, crystallization and morphology of poly(aryl ether ketone ketone)". Polymer. 1992, vol. 33, No. 12, pp. 2483-2495. (Year: 1992).*
(Continued)

*Primary Examiner* — Alexander M Weddle
(74) *Attorney, Agent, or Firm* — David Weisberg

(57) ABSTRACT

The invention relates to heat treatment of polymorphic semicrystalline or crystallizable polymers to increase the content of the highest melting crystalline form. Such heat treatment results in a polymer powder that has a consistent, uniform melting range, improved flow and improved durability of the powder particle size for applications that require powder flow at elevated temperatures. In addition to improved powder properties, the articles produced from the powders also exhibit better physical properties in both appearance and in mechanical properties. Thus the invention also includes polymer powders and articles produced by the described processes.

13 Claims, 2 Drawing Sheets

Related U.S. Application Data continuation of application No. 15/420,273, filed on Jan. 31, 2017, now Pat. No. 10,519,309, which is a continuation of application No. 13/879,478, filed as application No. PCT/US2011/053368 on Sep. 27, 2011, now Pat. No. 9,587,107.

(60) Provisional application No. 61/386,741, filed on Sep. 27, 2010.

(51) Int. Cl.
    *B29C 39/08*   (2006.01)
    *B29C 64/153*  (2017.01)
    *B33Y 10/00*   (2015.01)
    *B33Y 70/00*   (2020.01)
    *C08G 8/02*    (2006.01)
    *C08L 71/00*   (2006.01)
    *B29K 71/00*   (2006.01)

(52) U.S. Cl.
    CPC ............... *B33Y 70/00* (2014.12); *C08G 8/02* (2013.01); *C08L 71/00* (2013.01); *B29K 2071/00* (2013.01); *B29K 2995/004* (2013.01); *B33Y 10/00* (2014.12); *C08G 2650/40* (2013.01); *C08L 2205/025* (2013.01)

(56) References Cited

U.S. PATENT DOCUMENTS

| | | | |
|---|---|---|---|
| 7,601,422 B2 | 10/2009 | Gersch et al. | |
| 8,299,208 B2 | 10/2012 | Muller et al. | |
| 8,317,508 B2 | 11/2012 | Bokodi et al. | |
| 8,318,087 B2 | 11/2012 | Geddes | |
| 8,420,001 B2 | 4/2013 | Leuterer et al. | |
| 8,658,078 B2 | 2/2014 | Weidinger et al. | |
| 8,710,144 B2 | 4/2014 | Hesse et al. | |
| 8,784,720 B2 | 7/2014 | Oberhofer et al. | |
| 8,967,990 B2 | 3/2015 | Weidinger et al. | |
| 9,011,982 B2 | 4/2015 | Muller et al. | |
| 9,587,107 B2 | 3/2017 | Bertelo | B29B 9815/00 |
| 10,519,309 B2 | 12/2019 | Bertelo | C08L 61/16 |
| 2004/0131910 A1 | 7/2004 | Bauer | |
| 2005/0207931 A1 | 9/2005 | Hesse et al. | |
| 2006/0229373 A1 | 10/2006 | Guerra et al. | |
| 2007/0197739 A1 | 8/2007 | Aneja et al. | |
| 2008/0258330 A1* | 10/2008 | Muller | C08J 3/14 |
| | | | 528/125 |
| 2009/0017220 A1* | 1/2009 | Muller | B29C 64/153 |
| | | | 427/493 |
| 2009/0295042 A1 | 12/2009 | Pfister et al. | |
| 2011/0165430 A1 | 7/2011 | Hesse et al. | |
| 2013/0273131 A1 | 10/2013 | Frangov et al. | |

OTHER PUBLICATIONS

Gardner et al., "Structure crystallization and morphology of poly (aryl either ketone ketone)" (1992). Polymer, vol. 33 No. 12, p. 2483-2495.

Cheng, Z. D., et al., "Polymorphism and crystal structure identification in poly(aryl ether keone keton)s", Macromol—Chem Phys. 197, pp. 185-213 (1996).

Klon E.A., et al., "Polymorphism in alternating nolvetones studied bv x-ray diffraction and calorimetry", Journal of Poly Science—Part B: Polymer Physics, vol. 33, pp. 315-326 (1995).

Gardner et al, "Structure, crystallization and morphology of poly(aryl ether ketone ketone", Polymer, 1992, vol. 33, No. 12, pp. 2483-2494.

* cited by examiner

HEAT TREATED POLYMER POWDERS

CROSS-REFERENCE TO RELATED APPLICATIONS

This application is a continuation application of U.S. Ser. No. 16/704,134, filed Dec. 5, 2019, which is a continuation application of U.S. Ser. No. 15/420,273, filed Jan. 31, 2017, now U.S. Pat. No. 10,519,309, which is a continuation application of U.S. Ser. No. 13/879,478, filed Aug. 2, 2013, now U.S. Pat. No. 9,587,107, which is a national stage application under 35 U.S.C. § 371 of PCT/US2011/053368, filed Sep. 27, 2011, which claims benefit to U.S. patent application Ser. No. 61/386,741 filed on Sep. 27, 2010, all of which are hereby incorporated by reference herein in their entireties.

FIELD OF THE INVENTION

The invention relates to heat treatment of polymorphic semicrystalline polymers to provide more uniform melting, improve powder flow and lower attrition rates in applications that require powder handling at elevated temperatures and the polymer powders produced by the heat treatment processes. The invention also relates to the polymeric materials created by the heat treatment.

BACKGROUND OF THE INVENTION

Polymorphic materials, having more than one crystalline form, are well known in the art. Several studies have identified these crystalline structures in alternating polyketones and poly(aryl ether ketone ketone) such as Cheng, Z. D. et al, "Polymorphism and crystal structure identification in poly(aryl ether ketone ketone)s", *Macromol. Chem Phys.* 197, 185-213 (1996); and Klop. E. A., et. al., "Polymorphism in Alternating Polyketones Studied by X-ray Diffraction and Calorimetry", *Journal of Polymer Science: Part B: Polymer Physics*, Vol. 33, 315-326 (1995).

Annealing is known to assist in the development of crystallinity in many semicrystalline polymers. These processes are used in polymer processing and in post forming treatments of polymeric and metallic articles. Typical annealing processes hold the materials above the glass transition of the polymer. These treatments will increase the crystallinity, but may not fully develop the potential level of crystallinity and will not promote a crystal-to-crystal transformation.

US patent application no. 2008/0258330 describes a typical annealing process for poly aryl ether ketone (PAEK) powders. It is believed that this process does not provide the benefits of a highly crystalline material with a narrow melting point range. The described process anneals in a typical fashion "at 20° C. or more above the Tg" and suggests that the temperature of the annealing process should be 30° C. below the melting point of the powder.

We have discovered that heat-treating a semicrystalline or crystallizable polymorphic polymer at a temperature above the melting point(s) of the lower-melting crystalline form(s), but below the highest crystalline melting point, produces a material that maximizes the content of the highest melting crystalline form—unlike in a normal annealing process. The resulting polymer powder has a more uniform melting range, and additionally has improved powder flow and improved durability.

In some applications, such as with polyether ketone ketone (PEKK) powders, surprisingly, the crystallinity developed in the powder is retained through the part manufacturing process and results in improved physical properties and reduced deformation than can be developed by post-production annealing.

BRIEF SUMMARY OF THE INVENTION

Figure 1:
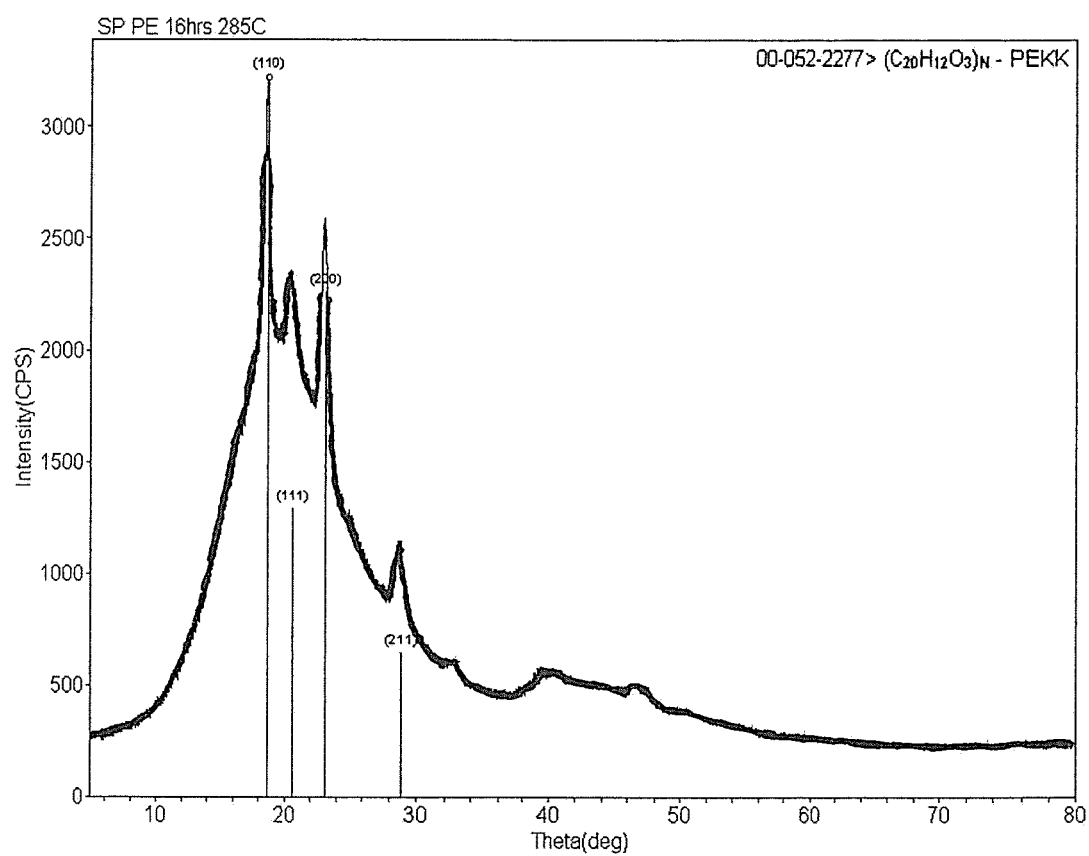
FIG. 1 is a characteristic X-ray Diffraction (XRD) pattern for Form I of polyetherketoneketone (PEKK) polymer.

The invention relates to heat treatment of polymorphic semicrystalline or crystallizable polymers in order to increase and/or maximize the content of the highest melting crystalline form and to increase the melting point of the crystalline phases of the polymer so that the polymer powder has a consistent, uniform melting range, improved flow and improved durability of the powder particle size for applications that require powder flow at elevated temperatures. In addition to improved powder properties, the articles produced from the powders also exhibit better physical properties in both appearance and in mechanical properties.

In one embodiment of the invention, a process is provided for heat-treating a polymer composition having one or more polymorphic semicrystalline or crystallizable polymers where the process includes at least the step of heat-treating the polymer composition at a temperature below the melting point of a highest melting crystalline form and at or above the melting point of the other crystalline form(s), for a time that increases the content of the highest melting crystalline form relative to the other crystalline form(s) in the polymer composition.

In another embodiment, a process is provided for heat-treating a polymer composition comprising one or more polyetherketoneketone polymers capable of having at least two crystalline forms, comprising at least the step of heat-treating the polymer composition at a temperature below the melting point of a highest melting crystalline form and within or above the melting range of other crystalline form(s), for a time that increases the content of the highest melting crystalline form relative to the other crystalline form(s) in the polymer composition.

In yet another embodiment, a process is provided for increasing the content of Form I of polyetherketoneketone that includes at least the step of heat treating a polymer composition comprising Form II of polyetherketoneketone at a temperature within or above the melting range of Form II of polyetherketoneketone and below the melting point of Form I of polyetherketoneketone so as to increase the content of Form I polyether ketoneketone relative to the content of Form II of polyetherketoneketone.

The present invention also provides polymer powder compositions produced by the processes of the present invention as well as articles and coatings formed from the polymer powder compositions.

Also provided herein, is a method for improving the physical properties (such as mechanical strength and or flow properties) of a polymer powder composition or article that includes heat treating a polymer composition having one or more polymorphic semicrystalline or crystallizable polymers according to the methods described herein; and optionally forming an article from a composition comprising the heat treated polymer composition. In one embodiment the article is formed by a laser or pressure sintering process.

DETAILED DESCRIPTION OF THE INVENTION

The present invention relates to specific heat treatment processes of polymer compositions containing polymorphic semicrystalline and/or crystallizable polymers. In some embodiments, it is desired to maximize the crystallinity of the material and/or obtain higher crystalline phase melting points. The advantages of heat treatment are especially seen in the properties of the polymer powder and articles formed therefrom.

Polymers

The polymers most useful in the polymer compositions are polymorphic semicrystalline polymers and/or polymers capable of becoming semicrystalline upon being subjected to temperatures above the glass transition temperature of the polymer. As used herein, by "semicrystalline or crystallizable polymorphic polymers" it is meant that the polymer is capable of existing in more than one crystalline form and that the polymer has one or more regions that is crystalline and/or is capable of forming one or more regions of crystallinity upon heat treatment. Examples of such polymers include, but are not limited to: Poly aryl ether ketones (PAEK) or alternating polyketones or mixtures thereof. Poly aryl ether ketones (PAEK)s have very high melting points and often crystallize in multiple forms. Both of these properties make the heat treatments of this invention especially useful for PAEK polymers when used in applications where powdered materials will be subject to high heats for extended periods of time.

The present invention is especially useful for polyetherketoneketones (PEKK). Polyetherketoneketones are well-known in the art and can be prepared using any suitable polymerization technique, including the methods described in the following patents, each of which is incorporated herein by reference in its entirety for all purposes: U.S. Pat. Nos. 3,065,205; 3,441,538; 3,442,857; 3,516,966; 4,704,448; 4,816,556; and 6,177,518. PEKK polymers differ from the general class of PAEK polymers in that they often include, as repeating units, two different isomeric forms of ketone-ketone. These repeating units can be represented by the following Formulas I and II:

where A is a p,p'-Ph-O-Ph- group, Ph is a phenylene radical, B is p-phenylene, and D is m-phenylene. The Formula I:Formula II isomer ratio, commonly referred to as the T:I ratio in the polyetherketoneketone is selected so as to vary the total crystallinity of the polymer. The T/I ratio is commonly varied from 50:50 to 90:10, and in some embodiments 60/40 to 80/20. A higher T:I ratio such as, 80:20, provides a higher degree of crystallinity as compared to a lower T:I ratio, such as 60:40.

The crystal structure, polymorphism and morphology of homopolymers of PEKK have been studied and have been reported in for example Cheng, Z. D. et al, "Polymorphism and crystal structure identification in poly(aryl ether ketone ketone)s", *Macrorol. Chem Phys.* 197, 185-213 (1996), the disclosure of which is hereby incoporated by reference in its entirety. This article studied PEKK homopolymers having all para-phenylene linkages [PEKK(T)], one meta-phenylene linkage [PEKK(I)] or alternating T and I isomers [PEKK(T/I)]. PEKK(T) and PEKK(T/I) show crystalline polymorphism depending upon the crystallization conditions and methods.

In PEKK(T), two crystalline forms, forms I and II are observed. Form I can be produced when samples are crystallized from the melt at low supercoolings, while Form II is typically found via solvent-induced crystallization or by cold-crystallization from the glassy state at relatively high supercooling. PEKK(I) possesses only one crystal unit cell which belongs to the same category as the Form I structure in PEKK(T). The c-axis dimension of the unit cell has been determined as three phenylenes having a zig-zag conformation, with the meta-phenylene lying on the backbone plane. PEKK(T/I) shows crystalline forms I and II (as in the case of PEKK(T)) and also shows, under certain conditions, a Form Ill.

Suitable polyetherketoneketones are available from several commercial sources under various brand names. For example, polyetherketoneketones are sold under the brand name OXPEKK™ polymers by Oxford Performance Materials, Enfield, Connecticut, including OXPEKK™-C, OXPEKK™-CE, OXPEKK™-D and OXPEKK™-SP polymers. Polyetherketoneketone polymers are also manufactured and supplied by Arkema. In addition to using polymers with a specific T:I ratio, mixtures of polyetherketoneketones may be employed.

Other useful polymers in the present invention include, but are not restricted to PEEKEK, PEEKK, PEKEKK (where the E=ether and the K=ketone). Blends or mixtures of polyetherketoneketones may also be employed within the scope of this invention. Other polyniorphic polymers that could benefit from the heat-treatment of the invention include, but are not limited to: polyamide 11 (PA11) and polyvinylidene fluoride (PVDF) homopolymers and copolymers.

The heat treatment described in this invention could also be applicable to materials with a single crystal form such as PEEK (polyether ether ketone) and PEK (polyether ketone), where the treatment at elevated temperatures will promote increases in the linear degree of crystallinity of the crystalline lamellae, affecting in a direct manner the melting temperature of the final product.

The powders used in these applications are produced by a variety of processes such as grinding, air milling, spray drying, freeze-drying, or direct melt processing to fine powders. The heat treatment can be accomplished before or after the powders are produced, but if treated prior to forming the powders, the temperature of the powder forming process must be regulated so as to not significantly reduce the melting temperature or the quantity of the crystallinity formed in the heat treatment process.

The heat treatment process and the powders produced by this process are not limited to any particular particle size. And as discussed above, the particle size can be adjusted prior to or after the heat treatment process based on the needs of the specific application as long as the beneficial properties of high melting point and high degree of crystallinity are not compromised. In general, heat-treated powders will have a weight average particle size of between 0.002 nm to 0.1 meter, and more preferably from 0.01 nm to 1.0 mm. For use in selective laser sintering (SLS) a weight average particle size of 15 to 150 microns is preferred.

Heat Treatment Process

In accordance with the present invention, polymorphic semicrystalline or crystallizable polymers of a variety of structures are heat treated in a way that increases the melting point of the crystals to afford better powder handling and durability in applications that require powder flow at elevated temperatures.

In some embodiments, the polymers during heat treatment are subjected to a temperature that is within or above the melting range of at least one or all of the lower-melting crystalline polymorph(s) and below the melting point of the highest-melting crystalline form. In other embodiments, it is desired to subject the polymers to a temperature that is at or above the melting point of at least one or all of the lower melting crystalline polymorph(s) and below the melting point of the highest melting crystalline form. As used herein, "melting range" refers to the temperature range beginning at the temperature where the particular crystalline form of the polymer begins to melt and ending at and including the melting point (Tm) of that crystalline form. The melting range and melting point (Tm) of the crystalline forms of a polymer can be identified by various analytical techniques known to those skilled in the art such as DSC and X-ray diffraction. Preferably, the melting point of the polymer is identified by X-ray diffraction.

In other embodiments, it is desired that the heat-treatment occur within or above the melting range of the second highest melting crystalline phase, but below the highest melting crystalline form. In some embodiments, it is desired that the heat-treatment temperature is at or above the melting point of the second highest melting crystalline phase, and below the melting point of the highest melting crystalline form, provided that if the heat treatment, temperature is too close to the highest melting crystalline phase melting point, the material will soften and stick together. In some embodiments, the heat treatment is performed at a temperature within 15° C. below the Tm of the highest melting crystalline form, and more preferably between 1° C. to 10° C. below the Tm of the highest melting crystalline form. In other embodiments, the temperature of heat treatment is less than 20° C., or less than 10° C. or less than 5° C. below the Tm of the highest melting crystalline form.

The polymer is maintained and/or subjected to one or more temperatures within this range for a period of time to increase and in some embodiments maximize the total quantity of the highest melting crystalline form. In some embodiments after heat treatment, the quantity of the highest melting crystalline form in the composition is at least 40% or greater based on the total number of crystals after heat treatment, in other embodiments the quantity of the highest melting crystalline form is at least 90% or greater based on the total number of crystals after heat treatment. In some embodiments, it is desired to convert all crystals (100%) to the highest melting crystalline form.

In other embodiments, the polymer is subjected to this temperature range to increase, and in some embodiments, maximize the melting temperature of the polymer. The amount of time needed will depend upon each polymer, and will be less the closer the heat treatment temperature is to the melting point of the highest melting crystalline form. However, if the heat treatment temperature is too close to the highest Tm, the powder or pellets may fuse together, causing the possible need for subsequent processing of the polymer composition to return it to its original form.

Heat treatment is particularly useful for polymorphic semicrystalline or crystallizable polymers, as the physical properties of powders produced from these polymers will tend to change when kept at elevated temperatures, close to or above the melting points of some of the crystalline forms. For example, subjecting the polymorphic semicrystalline or crystallizable polymers to temperatures within or above all the melting range(s) of the lower melting crystalline form(s) and below the melting point of the highest melting crystalline form, the lower melting crystal(s) will at least partially convert to the higher melting crystalline forms. These changes translate into variations in the processing of the powders and in the physical properties and/or the appearance of the final article.

In one embodiment, the polymer composition comprises a polyetherketoneketone (PEKK) capable of having at least two crystalline forms. In this embodiment, it is possible that the PEKK is initially amorphous, but upon being subjected to heat treatment, at least a portion of the PEKK converts to at least one crystalline form, which form is capable of being converted at least in part to a higher melting crystalline form. The heat treatment step is then capable of increasing the content of the higher melting crystalline form by subjecting the polymer composition to a temperature below the melting point of the highest melting crystalline form and within or above the melting range of the other crystalline form(s), for a time that increases the content of the highest melting crystalline form relative to the other crystalline form(s) in the polymer composition.

In some embodiments, the higher melting crystalline form is Form I of polyetherketoneketone and the other crystalline form(s) is Form II of polyetherketoneketone. In some embodiments for PEKK having a T:I ratio of about 60:40, the heat treatment temperature may range for example from about 230° C. to about 300° C., and in other embodiments from about 275° C. to about 290°. In some embodiments for PEKK having a. T:I ratio of about 80:20, the heat treatment temperature may for example range from about 270° C. to about 375° C., and in other embodiments from about 330° C. to about 370° C.

In yet another embodiment, a process is provided for increasing the content of Form I of polyetherketoneketone that includes at least the step of heat treating a polymer composition comprising Form II of polyetherketoneketone at a temperature within or above the melting range of Form II of polyetherketoneketone and below the melting point of Form I of polyetherketoneketone. In this embodiment, again it is possible that the starting polyetherketoneketone is initially amorphous, but upon heat treatment, at least a portion of the polyetherketoneketone converts to Form II. In some embodiments after heat treatment, the quantity of Form I polyetherketoneketone in the composition is at least 40% or greater based on the total number of PEKK crystals after heat treatment, in other embodiments the quantity of Form I is at least 90% or greater based on the total number of PEKK crystals after heat treatment. In some embodiments, it is desired to convert all PEKK crystals (100%) to Form I.

In addition to treating the semicrystalline or crystallizable polymorphic polymers themselves, the present invention contemplates heat-treating blends of polymers or polymer composites. Accordingly, the polymer composition containing semicrystalline or crystallizable polymorphic polymers may also include one or more non-polymorphic polymers, fillers, fibers or other additives typically used in such polymer compositions. Such other components, may, if present, be in an amount of about 0.5 wt % to about 40 wt % based on the total weight of the composition. The heat treatment process of the invention is also not limited to homogeneous polymeric compositions. Heterogeneous polymer compositions, such as polymer composites, polymer blends, and/or filled systems may also benefit from the heat treatment processes of the present invention.

Heat treatment may be accomplished in many different ways, as would be known to one of ordinary skill in the art based on the present description. Suitable heat treatment equipment includes for example, ovens (such as static, continuous, batch, convection), fluid bed heaters or the like. In one embodiment, the polymer may be treated in an oven, in the form of a powder, pellets, sheets or other forms. An advantage of heat treating pellets, sheets or other large solid forms is that any agglomeration that might occur is minimal. Such polymer forms may then, if desired, be subjected to grinding after heat treatment. In another embodiment of the present invention, it may be desired to grind the polymer composition prior to heat treatment as the grinding may cause some spot heating of the polymer composition, and if this temperature exceeds the melting point of the polymer(s), the crystallinity may be reduced.

In another embodiment, a polymer powder may be heat-treated in a fluidized bed. The use of a fluidized bed promotes more even heating compared to a conventional oven, and the agitation helps to prevent agglomeration during heat treatment.

Properties of Treated Powders

When the T:I ratio is relatively low, such as 60:40, the rate of crystallization is so slow that crystals do not usually form in melt processed polymers unless the materials are heat treated, or annealed, by maintaining the polymer at a temperature above its glass transition temperature for a period of time. Thus, these polymers are often referred to as amorphous polymers even though they are semi-crystalline in nature. An amorphous polymer, for purposes of this invention, means a polymer that does not exhibit a crystalline phase by X-ray diffraction. The commercially available OXPEKK™-SP polymer grade of PEKK is an example of a composition that may be initially amorphous, but upon heat treatment above the glass transition temperature becomes partially crystalline.

For OXPEKK™-SP polyetherketoneketone, (T:I=60:40), the Tg is about 155° C., while the Tm of the lowest melting polymorph is about 272° C. The Tm of the highest melting polymorph is about 297° C. The effect on the type of crystals formed and the sensitivity to the heat treatment temperature is illustrated in Table 1 for this polymer. The percent crystallinity, is essentially maximized after eight hours of annealing at 196° C. (40° C. above the Tg) but there is little or no change in the quantity of the high melting crystals at these temperatures. As illustrated in Table 1, the quantity of the high temperature crystals begins to change when the heat treating temperature approaches that of the melting point of the lower melting crystal form. Conversion to the higher melting crystal form is essentially maximized to 99% when the heat treatment temperature is above the melting point of the lower melting crystal form.

TABLE 1

Crystal Types By Heat Treatment Of A Polymorphic Semicrystalline Polymer
Heat treatment of OXPEKK ™ SP polymer
($T_g$ = 155° C., $T_{m1}$ = 273° C., $T_{m2}$ = 297° C.)

| | | | | | | |
|---|---|---|---|---|---|---|
| Heat treatment temperature (deg C., hr). | none | 196, 8 | none | 196, 8 | 260, 5 | 283, 5 |
| Percent Crystallinity by XRD | 19 | 26 | 1.9 | 26 | 29 | 28 |
| Percent of high melting crystals by XRD | 6.5 | 18.3 | 7.9 | 8.8 | 35 | 99 |

While the present invention is especially useful for poly (aryl ether ketones) with slow crystallization rates such as OXPEKK-SP polyetherketoneketone, the treatment will also be useful in more crystalline polymorphic polymers such as OXPEKK-C or the higher Mw OXPEKK CE polyetherketoneketone, both having a T:I ratio of about 80:20. These polyetherketoneketone polymers have higher Tgs and wide melting point ranges due to the multiple crystallites that are present. Typically these polymers, with T:I ratios of 80:20, show melting ranges of from about 270° C. to about 375° C., and a melting point from about 330° C. to about 370° C., and have Tgs near 160° C. Heating at 20° C. above the glass transition temperature may assist in developing the total crystallinity but will not significantly alter the types of crystals or significantly narrow the melting point range. These effects are most efficiently provided when the heat treatment temperatures are designed to be within or above the melting range of the lower melting polymorph(s) but below the melting point of the higher melting polymorph, which is an embodiment of the present invention.

By the use of the heat treatment processes of the present invention, the powders will show little change in properties during the application, thus providing more uniform articles or coatings, often with better physical properties and will provide higher use rates, or lower losses, and better recycleability of the powders. Thus the present invention may be useful in any process where semicrystalline or crystallizable polymer powders are used at elevated temperatures, especially temperatures that are approaching or within the measured melting points of the crystallites.

Specific benefits of the heat-treated powders are superior powder management in a bed—with little or no clumping; improved consistency of mechanical properties on x, y, z axis in the bed of the SLS process; and excellent flow into small features of powder coating or rotomolding processes. In the SLS process, powders obtained by the process of the invention provide properties that are equivalent three-dimensionally. Although not as desirable, it is possible to perform the heat treatment during the SLS process. In some embodiments, the heat treatment is performed prior to the SLS process.

Another advantage of using the heat-treated powders of the present invention is that lower bed temperatures in SLS processes can be used, making the powder useful in a larger variety of machines, and reducing wear and tear, and energy consumption.

Uses

Examples of applications that benefit from good powder flow at elevated temperatures are rotomolding, selective laser sintering and powder coating; though the use of the powders produced in the heat treatment process of the invention is not limited to these applications. Powders undergoing the heat treatment would be useful in any application where good flow, sharp melting points and durability of the powders is required. It was surprisingly found that not only do these heat-treated powders provide better powder properties and better appearance of the final articles, but the physical properties of the final parts formed from the powder could be improved.

The beneficial properties produced by the heat treatment process will vary by application. For instance in rotomolding the powder is added to a mold that has the outer shape of the desired hollow product. The mold is constantly rotated in three-dimensions while being heated. The polymer powder adheres to the heated mold once the mold temperature is above the polymer melting point, producing a relatively uniform polymer layer on the entire inner surface of the mold, resulting in a hollow object the same shape as the mold. In order to uniformly cover the interior of the mold, the powder must flow into the various shapes in the interior of the mold. Flow is particularly important when the dimensions of the surface features of the mold are small. In this case hot, soft polymer powders can bridge the opening of the features and not properly fill the mold.

Similar issues can be found in powder coating applications, especially when the coating is applied using a fluidized bed. In one type of powder coating operation, a container of the powdered polymer is fluidized and in some cases heated by an air stream entering the bottom of the bed. An article to be coated is heated to above the melting point of the polymer and dipped into the fluidized bed in order to form a uniform coating on the hot article. In order to produce a uniform coating, the powder should have a uniform particle size and should melt and flow uniformly. While the hot article provides most of the heat needed to allow the powder to melt and flow, in some instances it can be beneficial to also heat the fluid bed, so as to preheat the polymer and also to not cool the heated part. In this instance the hot plastic particles can stick together and produce large agglomerates that do not flow well and may not melt uniformly, thus forming defects in the coating. Similarly, the action of the air can attrite weak particles and develop fine powder particles that can be blown out of the bed or can segregate in the bed to form uneven coatings. By heat-treating the powders, the melting range of the particles can be narrowed and refined so that the powder particles soften uniformly and controllably and melt and fuse into a uniform coating. In addition increasing the crystallinity increases the strength of the particles so that they are less likely to attrite to finer particles and be lost.

For selective laser sintering (SLS) a bed of powder is preheated in preheating chamber and then distributed as a thin layer in a sintering chamber where a laser is used to heat specific parts of the bed and selectively sinter part of the powder in a predetermined pattern. Following this, a second layer is produced in the bed and the material in the second layer is again heated and selectively sintered in a pattern. At the same time, the second layer is also fused to the sintered portion of the first layer. Successive layering and sintering can thus produce a three dimensional piece that is then removed from the unsintered powder bed. In this application, only a small portion, 50% or even as little as 10% of the total power used in the process, is sintered to become the usable part. Thus, it is very beneficial for the powder to be recyclable back into the next bed. Thus, it is beneficial if the powder melts uniformly to produce parts with good surface finish, and does not agglomerate into large particles or attrite.

Powders with high quantities of high melting crystallites may also be useful in standard, pressure sintering processes. In this type of process, the heat treated polymer powder may be placed in a mold and subjected to high pressure such that the amorphous regions of the polymer fuse together. The crystallinity of the finished parts can then be subjected to heat treatments such as standard annealing process or by the improved process described herein. However, as demonstrated above, if a typical annealing process is used the total crystallinity can be increased but the quantity of the high melting polymorphs will not be maximized.

Of the four applications described above, SLS and pressure sintering are unique in that the final process does not typically completely melt the polymer. Thus if the high percent of crystallinity or the high melting point of the higher melting crystalline polymorphs are not developed prior to the SLS or pressure sintering process, they may not be developed at all or the finished article may have to be heat treated after the SLS or pressure sintering process. This post fabrication heat treatment process not only adds cost to the process but can also lead to defective parts if the articles warp or deform during the heat treatment. Examples of articles that may be formed from selective laser sintering are disclosed in for example WO 2010/019463, the disclosure of which is hereby incorporated by reference in its entirety.

We believe this process and the materials produced by this process, in addition to the applications describe above, may also be useful in other applications not mentioned. The description of these specific processes is not meant to be limiting to where heat treated polymer compositions produced according to the present invention may be used.

EXAMPLES

To further investigate the findings in Table 1, OXPEKK™ SP polyetherketoneketone powders and pellets, having a T:I ratio of 60:40 were heat treated at temperatures of 200° C., 250° C. and 285° C. for a time ranging from 1 to 16 hours in a forced air oven.

To determine the morphology and crystallinity, the samples were analyzed by X-ray diffraction in theta-theta parallel beam geometry on a standard stage at the following conditions:

| | | |
|---|---|---|
| Tube current = 40 mA | Tube voltage = 40 kV | Radiation Cu K-alpha |
| Divergence slit = 1 mm | Parallel slit analyzer (0.011°) | |
| Range 2 theta = 5°-80° | Dwell time = 5 s | Step size = 0.02° |
| Divergence H slit = 10 mm | Parallel beam optic | Soller slits = 5° |
| Scatter slit = Receiving slit = open | | |

Table 2 shows the results for PEKK powders and Table 3 shows the results for the PEKK pellets. In both Tables, Form I is quantified by the intensity of its major crystalline plane of the principal unit cell, namely (110). Similarly, the amount of Form II is quantified by the intensity of its major crystalline plane of the principal unit cell, namely (020).

TABLE 2

Crystallinity and polymorphism data for Heat Treated PEKK Powders

| Example | Heat Treatment Description | Crystallinity (%) | Polymorph | $I_{(020)}/I_{(110)}$ integrated intensities | Est. Form I (110) |
|---|---|---|---|---|---|
| | Control | 27.8 | II only | NA | 0 |
| | 1 hr 200 C. | 32.6 | II + trace I | 48 | 2.0 |
| | 2 hr 200 C. | 32.3 | II + trace I | 36 | 2.7 |
| | 4 hr 200 C. | 32,9 | II + trace I | 36 | 2.7 |
| | 8 hr 200° C. | 33.4 | II + trace I | 35 | 2.8 |
| | 16 hr 200 C. | 33.7 | II + trace I | 35 | 2.8 |
| 2 | 1 hr 250 C. | 33.6 | II major + I | 7.1 | 12.3 |
| | 2 hr 250 C. | 33.1 | II major + I | 7.4 | 11.9 |
| | 4 hr 250 C. | 32.5 | II major + I | 7.5 | 11.7 |
| | 8 hr 250 C. | 32.8 | II major + I | 7.0 | 11.5 |
| | 16 hr 250 C. | 31.6 | II major + I | 7.4 | 11.9 |

TABLE 2-continued

Crystallinity and polymorphism data for Heat Treated PEKK Powders

| Example | Heat Treatment Description | Crystallinity (%) | Polymorph | $I_{(020)}/I_{(110)}$ integrated intensities | Est. Form I (110) |
|---|---|---|---|---|---|
| 3 | 1 hr 285 C. | 19.7 | I only | NA | 100.0 |
|  | 2 hr 285 C. | 22.2 | I only | NA | 100.0 |
|  | 4 hr 285 C. | 22.3 | I only | NA | 100.0 |
|  | 8 hr 285 C. | 22.9 | I only | NA | 100.0 |
|  | 16 hr 285 C. | 23.6 | I only | NA | 100.0 |

TABLE 3

Crystallinity And Polymorphism Data For Heat Treated PEKK Pellets

| Example | Heat Treatment Description | Crystallinity (%) | Polymorph | $I_{(020)}/I_{(110)}$ integrated intensities | Est. Form I (110) |
|---|---|---|---|---|---|
|  | Control | 0.0 | NA | NA | 0 |
|  | 1 hr 200 C. | 17.2 | II + I | 1.6 | 38.5 |
|  | 2 hr 200 C. | 21.4 | II + I | 1.1 | 47.6 |
|  | 4 hr 200 C. | 23.2 | II + I | 1.4 | 41.7 |
|  | 8 hr 200 C. | 22.6 | II + I | 1.3 | 43.5 |
|  | 16 hr 200 C. | 23.0 | II + I | 1.2 | 45.5 |
| 5 | 1 hr 250 C. | 26.8 | I major + II | 0.23 | 81.3 |
|  | 2 hr 250 C. | 26.3 | I major + II | 0.21 | 82.6 |
|  | 4 hr 250 C. | 26.0 | I major + II | 0.22 | 82.0 |
|  | 8 hr 250 C. | 27.1 | I major + II | 0.23 | 81.3 |
|  | 16 hr 250 C. | 27.2 | I major + II | 0.26 | 79.4 |
| 6 | 1 hr 285 C. | 15.1 | I only | NA | 100.0 |
|  | 2 hr 285 C. | 18.9 | I only | NA | 100.0 |
|  | 4 hr 285 C. | 17.3 | I only | NA | 100.0 |
|  | 8 hr 285 C. | 18.1 | I only | NA | 100.0 |
|  | 16 hr 285 C. | 18.2 | I only | NA | 100.0 |

As Shown in Tables 2 and 3, crystallinity values for the powders are higher than for the pellets, regardless of heating temperature. As can be seen from Table 3, the starting pellets are amorphous, but crystallinity is regained by heat treatment. Highest crystallinity values for pellets are achieved after short heating at 250° C. Further heating at 285° C., results in crystallinity decrease, partially because Form II is lost through polymorphic transition to Form I.

Crystallinity increases as a function of time for a temperature of 200° C. and 285° C. Most of the increase in crystallinity is seen after just 1 hour or 2 hours of heat treatment time. Crystallinity changes little after 1 hour when the temperature is 250° C.

Significant amounts of Form II remain after heat treating at 200° C. for both powders and pellets. At 250° C., the amount of Form I in both powders and pellets increases. When the temperature is further increased to 285° C. the crystal portions of both the powders and pellets are completely converted to Form I. Also, observed is an increase of crystal size of both Form I and Form II crystals as the temperature is increased.

Figure 2:
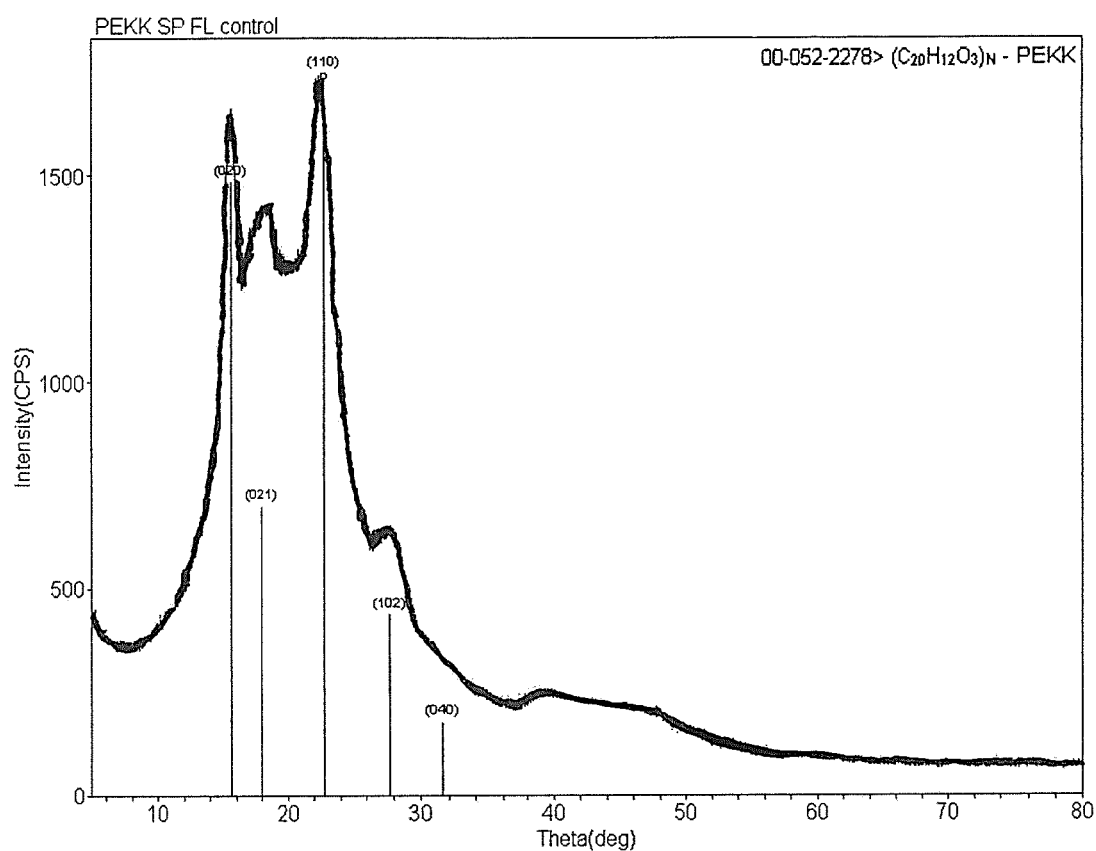
FIG. 2 is a characteristic XRD pattern for Form II of PEKK polymer.

X-Ray Diffraction Patterns for the pellets heat treated at 285° C. for 16 hours (Example 6) and the Control powder in Table 2 and are shown in FIGS. 1 and 2 respectively. FIG. 1 exemplifies an X-Ray Diffraction pattern for Form I and FIG. 2 exemplifies and X-Ray Diffraction pattern for Form II.

As shown in FIG. 1, PEKK Form I (typical from melt crystallization) has the following characteristic peaks (scattering angle), expressed in degrees 2θ, corresponding to its crystallographic planes:

| (hkl) | 2θ (deg.) |
|---|---|
| (110) | 18.65 |
| (111) | 20.64 |
| (200) | 23.17 |
| (211) | 28.92 |

As shown in FIG. 2, PEKK Form II (typical from solvent crystallization has the following characteristic peaks (scattering angle), expressed in degrees 2θ, corresponding to its crystallographic planes:

| (hkl) | 2θ (deg.) |
|---|---|
| (020) | 15.62 |
| (021) | 17.93 |
| (110) | 22.70 |
| (102) | 27.74 |
| (040) | 31.53 |

What is claimed is:

1. A polymer powder composition suitable for selective laser sintering, roto-molding or powder coating, said composition comprising:
   (i) at last one polymer selected from the group consisting of PEEK, PEK, PEEKEK, PEEKKK, PEKEKK, polyamide 11, and polyvinylidene fluoride, including homopolymers and copolymers thereof, and
   (ii) a heat-treated polymer composition comprising at least two semicrystalline or crystallizable polyetherketoneketone polymorphs having at least two different melting points, said heat-treated polymer composition (ii) made by a process of comprising at least the steps of:
   (a) determining heat treating conditions by selecting a temperature less than 20° C. below a melting point of a highest melting crystalline polymorph and at or above a melting point of another crystalline polymorph, and
   (b) heat-treating a composition comprising at least two semicrystalline or crystallizable polyetherketoneketone polymorphs at said temperature less than 20° C. below the melting point of the highest melting crystalline polymorph and at or above the melting point of the other crystalline polymorph(s), for a time that increases the content of the highest melting crystalline polymorphs relative to the other crystalline polymorph(s) in the polymer composition, and wherein the polyetherketoneketone comprises repeating unites represented by Formulas I and II:

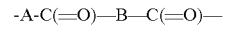

-A-C(=O)—B—C(=O)—          I(Isomer T)

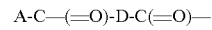

A-C—(=O)-D-C(=O)—          II(Isomer I)

where A is a p,p'-Ph-O-Ph- group, Ph is a phenylene radical, B is a p-range A phenylene, and D is m-phenylene, wherein the T:I isomer ratio is in range of from 50/50 to 90/10, thereby forming said heat-treated polymer composition (ii).

2. The polymer powder composition of claim 1 comprising said heat-range A treated polymer powder composition (ii), wherein the T:I ratio is in the range of 60:40 to 80:20.

3. The polymer powder composition of claim 1 comprising said heat-treated polymer powder composition (ii), wherein the T:I ratio is 60:40 or 50:50.

4. The polymer powder composition of claim 1, where said polymer powder composition is a blend or mixture.

5. The polymer powder composition of claim 1, where said polymer powder composition is a blend or mixture.

6. The polymer powder composition of claim 1 comprising said heat-treated polymer powder composition (ii), wherein the heat treating temperature ranges from about 260° C. to about 290° C.

7. A process for making the polymer powder composition of claim 1 comprising the step(s) of: blending, mixing, grinding, air milling, spray drying, freeze-drying, and/or direct melt processing said at least one polymer (i) and said heat-treated polymer composition (ii).

8. A polymer powder composition suitable for selective laser sintering, roto-molding or powder coating, said composition comprising:

(i) at least one polymer selected from the group consisting of PEEK, PEK, PEEKEK, PEEKK, PEKEKK, polyamide 11, and polyvinylidene fluoride, including homopolymers and copolymers thereof, and (ii) a heat-treated polymer composition comprising at least two semicrystalline or crystallizable polyetherketoneketone polymorphs (X) and (Y) having at least two different melting points, wherein one of (X) or (Y) polymorphs is a highest melting crystalline polymorph relative to other semicrystalline or crystallizable polyetherketoneketone polymorphs in said heat-treated polymer composition, and the other of (X) and (Y) polymorphs is a lower melting crystalline polymorph, and wherein the polyether-ketoneketone comprises repeating units represented by Formulas I and II:

where A is a p,p'-Ph-O-Ph- group, Ph is a phenylene radical, B is p-phenylene, and D is m-phenylene, wherein the T:I isomer ratio is in the range of from 50/50 to 90/10, whereby the content of the highest melting crystalline polymorph has been increased and/or maximized relative to the content of the other lower melting-crystalline polymorph in said heat-treated polymer composition by heat treatment.

9. The polymer powder composition of claim 8 comprising said heat-treated polymer composition (ii), wherein the T:I ratio is 60:40 or 80:20.

10. The polymer powder composition of claim 8 comprising said heat-ratio A treated polymer composition (ii), wherein the T:I ratio is 60:40 or 50:50.

11. The polymer powder composition of claim 8, wherein said polymer powder composition is a blend or mixture.

12. The polymer powder composition of claim 8, which is produced by blending, mixing, grinding, air milling, spray drying, freeze-drying, and/or direct melt processing said at least one polymer (i) and said heat-treated polymer composition (ii).

13. The polymer powder composition of claim 8 having a weight average particle size of 15 to 150 microns.

* * * * *